US008717514B2

(12) United States Patent
Minoura et al.

(10) Patent No.: US 8,717,514 B2
(45) Date of Patent: May 6, 2014

(54) ILLUMINATION DEVICE, AND DISPLAY DEVICE

(75) Inventors: Kazunori Minoura, Osaka (JP); Katsutoshi Kikuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 80 days.

(21) Appl. No.: 13/520,493

(22) PCT Filed: Sep. 27, 2010

(86) PCT No.: PCT/JP2010/066696
§ 371 (c)(1),
(2), (4) Date: Jul. 10, 2012

(87) PCT Pub. No.: WO2011/083600
PCT Pub. Date: Jul. 14, 2011

(65) Prior Publication Data
US 2013/0057805 A1 Mar. 7, 2013

(30) Foreign Application Priority Data
Jan. 6, 2010 (JP) .................................. 2010-001436

(51) Int. Cl.
*G02F 1/1335* (2006.01)
(52) U.S. Cl.
USPC .................................. 349/65; 349/58; 349/62

(58) Field of Classification Search
None
See application file for complete search history.

(56) References Cited

U.S. PATENT DOCUMENTS 8,223,297 B2 * 7/2012 Kim ................................ 349/65

FOREIGN PATENT DOCUMENTS

| JP | 1993-8542 U | 2/1993 |
| JP | 2003-346534 A | 12/2003 |
| JP | 2004-349019 A | 12/2004 |
| JP | 2005-5003 A | 1/2005 |
| JP | 2008-9374 A | 1/2008 |

* cited by examiner

*Primary Examiner* — Richard Kim
(74) *Attorney, Agent, or Firm* — Chen Yoshimura LLP

(57) ABSTRACT

An illumination device (3) is provided with a light-emitting diode (light source) (9), and a light guide plate (10) that guides light from the light-emitting diode (9) toward a prescribed propagation direction and that outputs the light toward a liquid crystal panel (object to be irradiated) (2). The illumination device is also provided with an optical sheet (optical member) (15) that is disposed so as not to make contact with the optical sheet (13) and that separates the optical sheet (13) from the liquid crystal panel (2) so as to create a prescribed space therebetween.

8 Claims, 8 Drawing Sheets

(a)

(b)

(a)

(b)

(a)

(b)

(a)

(b)

ILLUMINATION DEVICE, AND DISPLAY DEVICE

TECHNICAL FIELD

The present invention relates to an illumination device, and more particularly to an illumination device provided with a light source and a light guide plate that emits light from the light source toward an object to be irradiated such as a liquid crystal panel, and a display device equipped with the same.

BACKGROUND ART

In recent years, liquid crystal display devices have been widely used for liquid crystal televisions, monitors, mobile phones, and the like, for example, as flat panel displays that have advantages such as thinner-profile and lighter-weight than a conventional cathode ray tube. Such liquid crystal display devices are provided with an illumination device (backlight) that emits light and a liquid crystal panel that displays a desired image by serving as a shutter for light emitted from a light source in the illumination device.

The illumination device is mainly categorized into a direct-lighting type and an edge-lighting type depending on how the light source is arranged with respect to the liquid crystal panel, which is an object to be irradiated by light. In liquid crystal display devices that are used for mobile equipment such as mobile phones, laptop computers, and PDAs, for example, the edge-lighting type, which makes it easier to achieve a thinner-profile as compared with the direct-lighting type, is typically employed. That is, in the edge-lighting type illumination device, by disposing a light source on the side of a liquid crystal panel, a thinner-profile is achieved, and by using a light guide plate disposed such that a light-emitting surface thereof faces a non-display surface of the liquid crystal panel, light from the light source is provided to the liquid crystal panel.

Such an illumination device typically has optical sheets (optical members) such as a lens sheet (light collection sheet) and a diffusion sheet between the light guide plate and the liquid crystal panel. In the illumination device, these optical sheets are used to make the light emitted from the light guide plate brighter and more uniform before the light is emitted toward the liquid crystal panel as illumination light.

In the conventional illumination device, as described in Patent Document 1 below, for example, a technique of disposing optical sheets on a resin frame so as to prevent deformation or breakage of the optical sheets in a display section thereof even when the optical sheets undergo great mechanical stress such as drop impact has been disclosed. Specifically, in this conventional illumination device, a holding section was formed in the end portion of the optical sheets, and by placing the holding section of the optical sheets in a recess formed in the resin frame, the optical sheets were mounted to the resin frame. Also, in this conventional illumination device, at least one cut-out portion was formed in the optical sheets at a boundary between the display section and the holding section thereof, and even when great mechanical stress such as drop impact occurs, the effect of deformation caused by this mechanical stress can be significantly reduced by this cut-out portion, which made it possible to prevent deformation or breakage of the optical sheets in the display section thereof.

RELATED ART DOCUMENT

Patent Document

Patent Document 1: Japanese Patent Application Laid-Open Publication No. 2008-9374

SUMMARY OF THE INVENTION

Problems to be Solved by the Invention

However, in the conventional illumination device described above, when an external pressure is applied from the side where the liquid crystal panel (object to be irradiated) is disposed, it was possible that deformation such as warping in the optical sheets (optical members) occur, and due to this deformation of the optical sheets, light-emitting quality was lowered.

Specifically, in the conventional illumination device, the resin frame and the optical sheets were disposed so as to face the liquid crystal panel. Also, in the conventional illumination device, the cut-out portion was formed on the same plane as the optical sheets. Thus, in the conventional illumination device, when an external pressure was applied to the resin frame from the liquid crystal panel, and in particular, when the external pressure was applied in the direction that is perpendicular to the optical sheets, the external pressure was transmitted from the resin frame to the optical sheets through the holding section, and therefore, deformation such as warping occurred in the optical sheets. Consequently, in the conventional illumination device, it was possible that the deformation of the optical sheets caused a reduction in brightness of the illumination light emitted to the liquid crystal panel or uneven brightness of the illumination light, which resulted in the degradation of the light-emitting quality.

In view of the above-mentioned problems, the present invention is aiming at providing an illumination device that is capable of reliably preventing the deformation of the optical sheets such as warping even when an external pressure is applied from the side where an object to be irradiated is disposed and that thereby has excellent light-emitting quality, and a display device equipped with the same.

Means for Solving the Problems

In order to achieve the above-mentioned object, an illumination device according to the present invention includes a light source and a light guide plate that guides light from the light source toward a prescribed propagation direction and that emits the light toward an object to be irradiated, and further includes:

an optical member that is attached to the light guide plate on a side facing the object to be irradiated; and a separating member that is disposed so as not to make contact with the optical member and that separates the optical member from the object to be irradiated so as to create a prescribed space therebetween.

In the illumination device configured in the above-mentioned manner, the optical member is attached to the light guide plate on the side facing the object to be irradiated. Also, the separating member that is disposed so as not to make contact with the optical member and that separates the optical member from the object to be irradiated so as to create a prescribed space therebetween is provided. With this configuration, unlike the conventional example described above, even when an external pressure is applied from the side where the object to be irradiated is disposed, an occurrence of deformation such as warping in the optical member can be reliably prevented. As a result, the degradation of the light-emitting quality, which is caused by the deformation of the optical member, can be reliably prevented, and therefore, it becomes possible to achieve an illumination device having excellent light-emitting quality.

The illumination device may include:

a container with a bottom that houses the light source, the light guide plate, and the optical member; and as the separating member, a frame-shaped frame member that is disposed so as to surround a periphery of the light guide plate, the frame-shaped frame member being placed inside the container such that one end surface and another end surface thereof make contact with the object to be irradiated and a bottom surface of the container, respectively.

In this case, even when an external pressure is applied from the side where the object to be irradiated is disposed, an occurrence of deformation such as warping in the optical member can be reliably prevented by the frame member.

In the illumination device, it is preferable that the frame member have a cut-out portion that holds the light source such that the light source is disposed so as to face a light incident surface of the light guide plate.

In this case, it becomes possible to prevent the illumination device from becoming unnecessary large.

In the illumination device, the separating member may be disposed on a light-emitting surface of the light guide plate such that one end surface and another end surface thereof make contact with the object to be irradiated and the light-emitting surface of the light guide plate, respectively.

In this case, even when an external pressure is applied from the side where the object to be irradiated is disposed, an occurrence of deformation such as warping in the optical member can be reliably prevented by the separating member that is disposed on the light-emitting surface of the light guide plate.

In the illumination device, it is preferable that the separating member be formed integrally with the light guide plate.

In this case, the assembly operation of the illumination device can be simplified.

The illumination device may include: a reflective sheet that is attached to the light guide plate on an opposite surface side that is opposite to a light-emitting surface thereof; a container with a bottom that houses the light source, the light guide plate, the optical member, and the reflective sheet; and a second separating member that is disposed so as not to make contact with the reflective sheet and that separates the reflective sheet from the container so as to create a prescribed space therebetween.

In this case, even when an external pressure is applied from the side where the object to be irradiated is disposed, an occurrence of deformation such as warping in the reflective sheet can be reliably prevented by the second separating member.

In the illumination device, the second separating member may be disposed on the opposite surface of the light guide plate such that one end surface and another end surface thereof make contact with the opposite surface of the light guide plate and the bottom surface of the container, respectively.

In this case, even when an external pressure is applied from the side of the object to be irradiated, an occurrence of deformation such as warping in the reflective sheet can be reliably prevented by the second separating member that is disposed on the opposite surface of the light guide plate.

In the illumination device, it is preferable that the separating member and the second separating member are formed integrally with the light guide plate.

In this case, the assembly operation of the illumination device can be simplified.

A display device according to the present invention includes any one of the illumination devices described above.

The display device configured in the manner described above employs an illumination device that is capable of reliably preventing an occurrence of deformation such as warping in the optical member even when an external pressure is applied from the side where the object to be irradiated is disposed and that thereby has excellent light-emitting quality, and therefore, a display device that has high brightness and excellent display quality is achieved with ease.

The display device may include a liquid crystal panel as the object to be irradiated.

In this case, a liquid crystal display device that has high brightness and excellent display quality can be achieved with ease.

Effects of the Invention

According to the present invention, it becomes possible to provide an illumination device that is capable of reliably preventing an occurrence of deformation such as warping in the optical sheets even when an external pressure is applied from the side where an object to be irradiated is disposed and that thereby has excellent light-emitting quality, and a display device equipped with the same.

BRIEF DESCRIPTION OF THE DRAWINGS

FIG. 8(b) is an enlarged partial view for illustrating a configuration of a principal portion of the illumination device shown in FIG. 7.

DETAILED DESCRIPTION OF EMBODIMENTS

Preferred embodiments of the illumination device of the present invention and a liquid crystal display device equipped with the same are described below with reference to figures. In the following descriptions, a configuration in which the present invention is used for a transmissive liquid crystal display device is explained as an example. Also, dimensions of constituting members in the respective figures may not necessarily reflect dimensions of the actual constituting members, dimensional relationships of the respective constituting members, and the like in an accurate manner.

Embodiment 1

Figure 1:
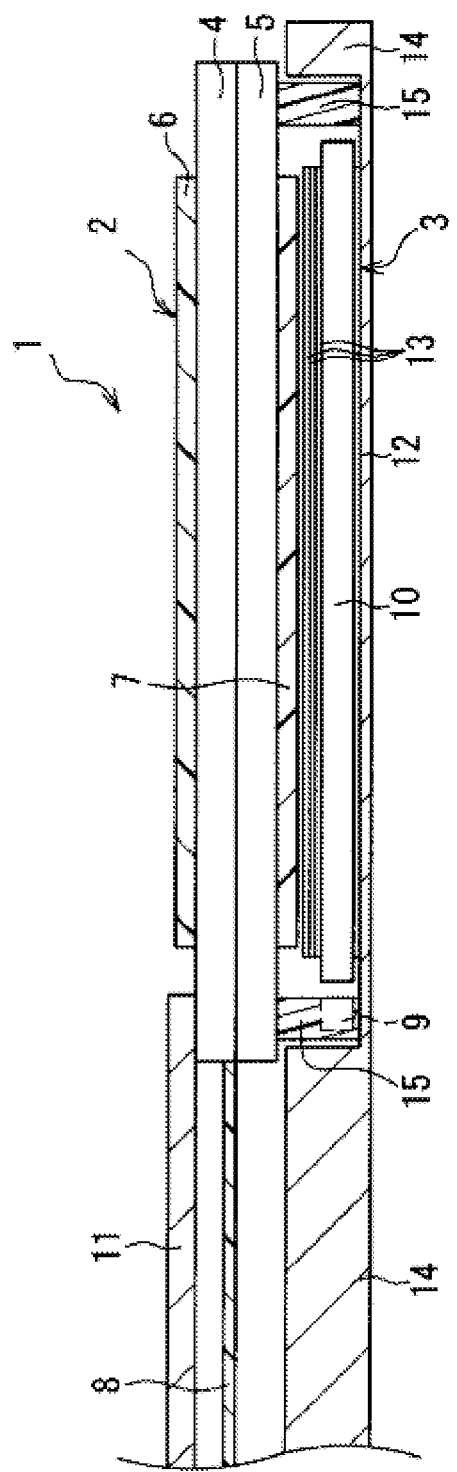
FIG. 1 is an explanatory diagram for an illumination device and a liquid crystal display device according to Embodiment 1 of the present invention.

FIG. 1 is an explanatory diagram for an illumination device and a liquid crystal display device according to Embodiment 1 of the present invention. In FIG. 1, a liquid crystal display device 1 of the present embodiment includes a liquid crystal panel 2 that is disposed such that the top side in FIG. 1 becomes the side facing the viewer (display surface side) and an illumination device 3 of the present invention that is disposed on a non-display surface side of the liquid crystal panel 2 (bottom side in FIG. 1) and that emits illumination light for illuminating the liquid crystal panel 2.

The liquid crystal panel 2 includes a pair of substrates constituted of a color filter substrate 4 and an active matrix substrate 5, and polarizing plates 6 and 7 that are respectively disposed on respective outer surfaces of the color filter substrate 4 and the active matrix substrate 5. Between the color filter substrate 4 and the active matrix substrate 5, a not-shown liquid crystal layer is sandwiched. The color filter substrate 4 and the active matrix substrate 5 are made of a plate-shaped transparent glass material or a transparent synthetic resin such as an acrylic resin. The polarizing plates 6 and 7 are made of a resin film such as TAC (Triacetyl Cellulose) or PVA (Polyvinyl Alcohol), and are respectively attached to the corresponding color filter substrate 4 and active matrix substrate 5 so as to cover at least an effective display region of the display surface in the liquid crystal panel 2.

The active matrix substrate 5 constitutes one substrate of the pair of substrates, and between the active matrix substrate 5 and the liquid crystal layer, pixel electrodes, thin film transistors (TFTs), and the like are formed so as to correspond to a plurality of pixels included in the display surface of the liquid crystal panel 2 (which will be described below in detail). On the other hand, the color filter substrate 4 constitutes the other substrate of the pair of substrates, and between the color filter substrate 4 and the liquid crystal layer, a color filter, an opposite electrode, and the like are formed (not shown).

The liquid crystal panel 2 is equipped with an FPC (Flexible Printed Circuit) 8 connected to a control device (not shown) that drives and controls the liquid crystal panel 2, and by activating the liquid crystal layer pixel by pixel, each pixel in the display surface is driven, and a desired image is thereby displayed on the display surface.

The liquid crystal mode and the pixel configuration of the liquid crystal panel 2 can be appropriately selected. The driving mode of the liquid crystal panel 2 can also be appropriately selected. That is, any liquid crystal panels capable of displaying information can be used as the liquid crystal panel 2. Therefore, the detailed structure of the liquid crystal panel 2 is not shown in FIG. 1, and the description thereof is omitted.

The illumination device 3 is equipped with a light-emitting diode 9 as a light source and a light guide plate 10 that is disposed so as to face the light-emitting diode 9. In the illumination device 3, as described below in detail, a plurality of light-emitting diodes 9 are disposed inside a frame member 15, which is a separating member, so as to be aligned in a direction perpendicular to the plane of a sheet of paper showing FIG. 1. In the illumination device 3, the light-emitting diodes 9 and the light guide plate 10 are held by a bezel 14 that has an L-shaped cross-section such that the liquid crystal panel 2 is disposed above the light guide plate 10. This bezel 14 is provided as a container with a bottom for the illumination device 3, and houses the light-emitting diodes 9, the liquid guide plate 10, and optical sheets 13 as optical members that are disposed on the light guide plate 10. The color filter substrate 4 has a case 11 placed thereon. In this manner, the illumination device 3 is mounted to the liquid crystal panel 2, and the two components are held as a single unit as the transmissive liquid crystal display device 1 in which illumination light from the illumination device 3 is emitted to the liquid crystal panel 2.

The light guide plate 10 is made of a transparent synthetic resin such as an acrylic resin, for example, and receives light from the light-emitting diodes (light source) 9. By this light guide plate 10, light from the light-emitting diodes 9 is guided toward a prescribed propagation direction (to the right in FIG. 1), and is emitted to the liquid crystal panel (object to be irradiated) 2. On the light guide plate 10, a reflective sheet 12 is disposed on the side opposite to the liquid crystal panel 2 (opposite surface side). The optical sheets 13 such as a lens sheet and a diffusion sheet are disposed on the light guide plate 10 on the side facing the liquid crystal panel 2 (light-emitting side), and by the optical sheets 13, the light from the light-emitting diodes 9, which travelled through the light guide plate in the propagation direction, is converted into the illumination light that is planar and that has uniform brightness, and is provided to the liquid crystal panel 2.

The reflective sheet 12 and the optical sheets 13 are respectively attached to the opposite surface and the light-emitting surface of the light guide plate 10 by a double-sided tape, for example. Also, in the illumination device 3 of the present embodiment, the frame member 15 is disposed so as not to make contact with the optical sheets 13, and separates the optical sheets 13 from the liquid crystal panel 2 so as to create a prescribed space therebetween (as described below in detail).

Figure 2:
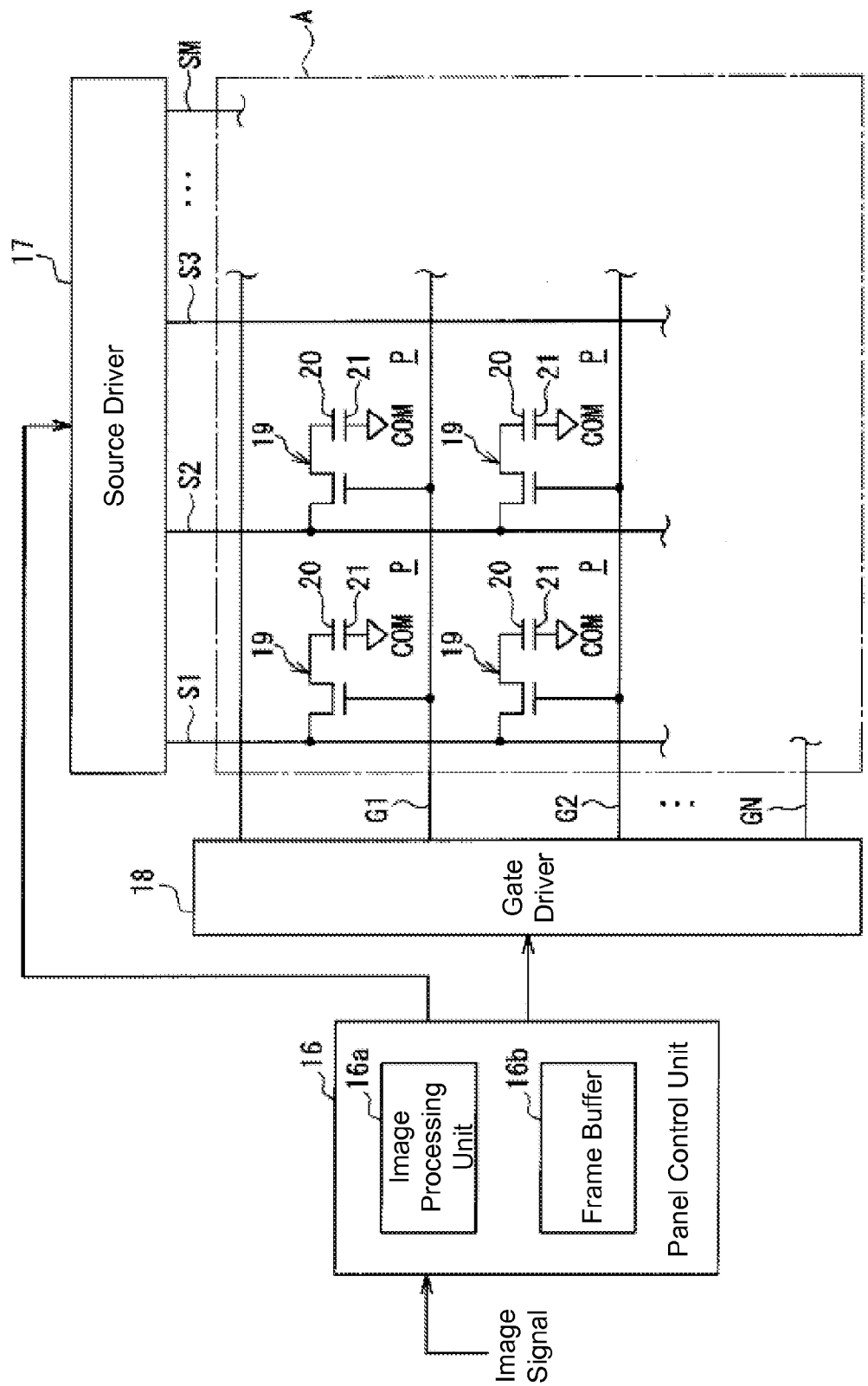
FIG. 2 is an explanatory diagram for a configuration of the liquid crystal panel shown in FIG. 1.

Next, with reference to FIG. 2, the liquid crystal panel 2 of the present embodiment will be specifically explained.

FIG. 2 is an explanatory diagram for a configuration of the liquid crystal panel shown in FIG. 1.

In FIG. 2, the liquid crystal display device 1 (FIG. 1) is equipped with a panel control unit 16 that drives and controls the liquid crystal panel 2 (FIG. 1), which is the display section that displays information such as texts and images, and a source driver 17 and a gate driver 18 that are operated based on instruction signals from this panel control unit 16.

The panel control unit 16 is provided in the control device, and receives an image signal from the outside of the liquid crystal display device 1. The panel control unit 16 includes an image processing unit 16a and a frame buffer 16b. The image processing unit 16a performs prescribed image processing to the received image signal, and generates respective instruction signals for the source driver 17 and for the gate driver 18. The frame buffer 16b is capable of storing display data for one frame that is included in the received image signal. The panel control unit 16 drives and controls the source driver 17 and the gate driver 18 in accordance with the received image signal, thereby displaying information corresponding to the image signal on the liquid crystal panel 2.

The source driver 17 and the gate driver 18 are provided on the active matrix substrate 5. Specifically, on the surface of the active matrix substrate 5, the source driver 17 is arranged along the horizontal direction of the liquid crystal panel 2 in a region outside an effective display region A of the liquid crystal panel 2 as the display panel. Also, on the surface of the active matrix substrate 5, the gate driver 18 is arranged along the vertical direction of the liquid crystal panel 2 in a region outside the effective display region A.

The source driver 17 and the gate driver 18 are driver circuits that individually drive each of a plurality of pixels P provided in the liquid crystal panel 2. A plurality of source wiring lines S1 to SM (M is an integer of 2 or greater; hereinafter collectively referred to as "S") and a plurality of gate wiring lines G1 to GN (N is an integer of 2 or greater; hereinafter collectively referred to as "G") are respectively connected to the source driver 17 and the gate driver 18. These source wiring lines S and the gate wiring lines G constitute data wiring lines and scan wiring lines, respectively, and are arranged in a matrix so as to intersect with each other on a base substrate (not shown) made of a transparent glass material or a transparent synthetic resin in the active matrix substrate 5. That is, the source wiring lines S are disposed on the base substrate so as to be parallel with the column direction of the matrix (vertical direction of the liquid crystal panel 2), and the gate wiring lines G are disposed on the base substrate so as to be parallel with the row direction of the matrix (horizontal direction of the liquid crystal panel 2).

Near respective intersections of the source wiring lines S and the gate wiring lines G, the pixels P that respectively include the thin film transistors 19 as switching elements and pixel electrodes 20 connected to the thin film transistors 19 are provided. The respective pixels P are configured such that the respective pixel electrodes 20 face a common electrode 21 through the liquid crystal layer provided in the liquid crystal panel 2. That is, in the active matrix substrate 5, each pixel is constituted of the thin film transistor 19, the pixel electrode 20, and the common electrode 21.

In the active matrix substrate 5, a plurality of regions for respective pixels P are respectively formed in regions that are bordered by the source wiring lines S and the gate wiring lines G and that are thereby arranged in a matrix. The plurality of pixels P include pixels of red (R), green (G), and blue (B). These RGB pixels are sequentially arranged in this order, for example, in parallel with the respective gate wiring lines G1 to GN. These RGB pixels can display the corresponding colors by a color filter layer (not shown) disposed in the color filter substrate 4.

In the active matrix substrate 5, the gate driver 18 sequentially outputs to the gate wiring lines G1 to GN a scan signal (gate signal) that turns on the gate electrodes of the corresponding thin film transistors 19 in accordance with the instruction signal from the image processing unit 16a. The source driver 17 outputs data signals (voltage signals (gradation voltages)), which correspond to the brightness (gradation) of the display image, to the corresponding source wiring lines S1 to SM in accordance with the instruction signal from the image processing unit 16a.

Figure 3:
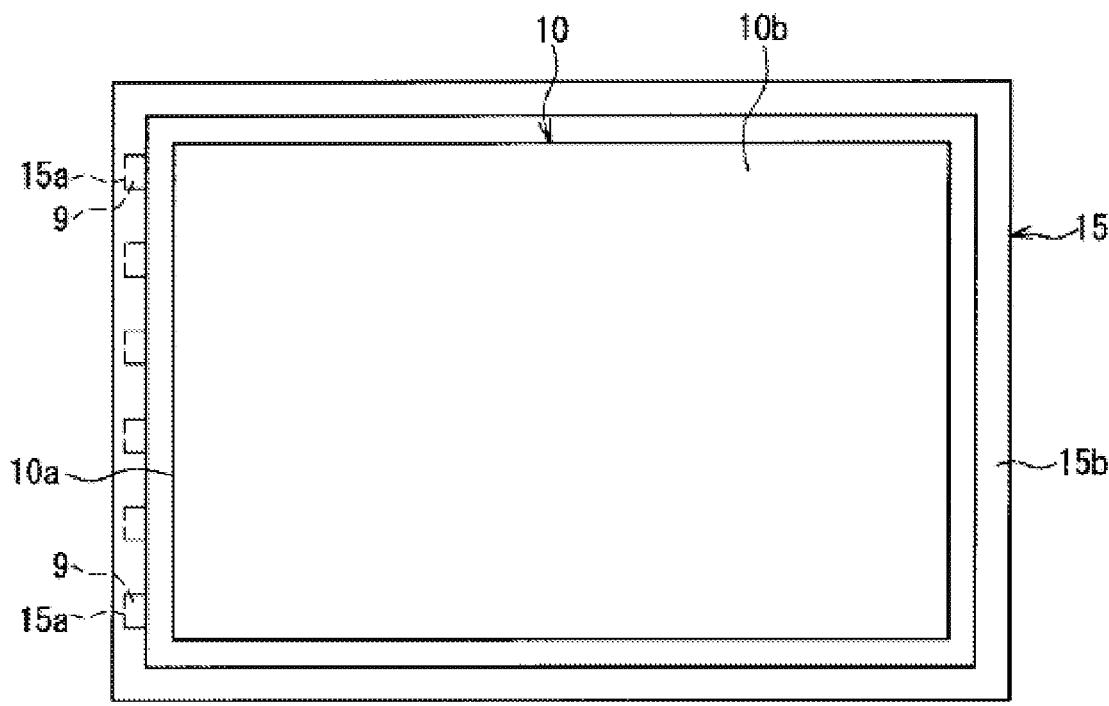
FIGS. 3(a) and 3(b) are a plan view and an enlarged partial view, respectively, for illustrating a configuration of a principal portion of the illumination device shown in FIG. 1.
Figure 3:
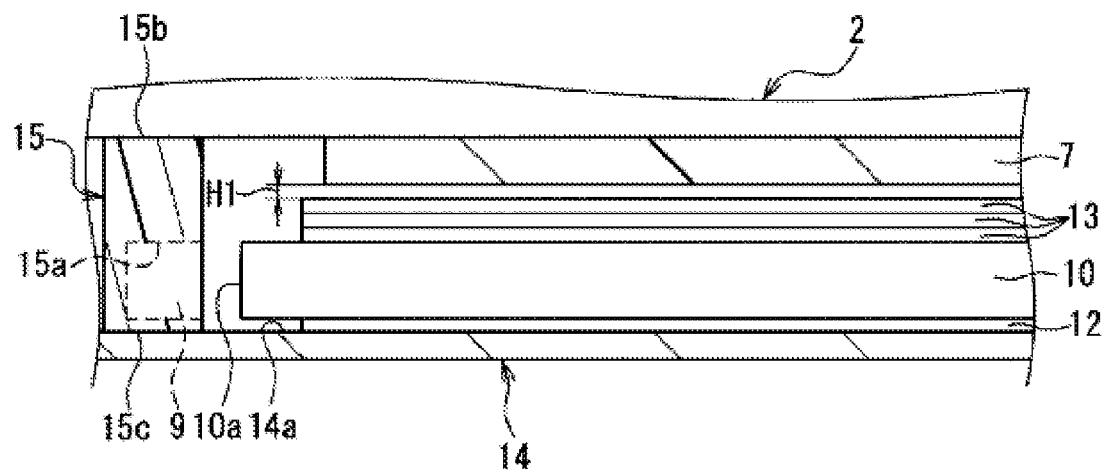

Next, with reference to FIG. 3, the configuration of the principal portion of the illumination device 3 of the present embodiment will be specifically explained.

FIGS. 3(a) and 3(b) respectively show a plan view and an enlarged partial view for illustrating the configuration of the principal portion of the illumination device shown in FIG. 1.

As shown in FIG. 3(a), in the illumination device 3 of the present embodiment, the frame member 15 is formed in a frame shape, and is disposed inside the bezel 14 so as to surround the light guide plate 10. Along one side of the frame member 15, cut-out portions 15a that are used to hold the light-emitting diodes 9 therein are formed such that a plurality of, which is six, for example, light-emitting diodes 9 are disposed so as to face a light incident surface 10a of the light guide plate 10. That is, in the frame member 15, six cut-out portions 15a are formed so as to correspond to the light-emitting diodes 9, and the light-emitting diodes 9 are disposed inside the respective cut-out portions 15a. This way, light from the respective light-emitting diodes 9 is incident on the light incident surface 10a of the light guide plate 10, and is emitted toward the liquid crystal panel 2 through the light-emitting surface 10b of the light guide plate 10.

As shown in FIG. 3(b), the frame member 15 is disposed inside the bezel 14 such that one end surface 15b and the other end surface 15c respectively make contact with the liquid crystal panel 2 and a bottom surface 14a of the bezel 14. This way, in the illumination device 3 of the present embodiment, the optical sheets 13 are disposed so as to have a prescribed space/distance from the liquid crystal panel 2 as indicated by "H1" in FIG. 3(b).

In the illumination device 3 of the present embodiment configured in the manner described above, the optical sheets (optical members) 13 are affixed to the light guide plate 10 on the side facing the liquid crystal panel (object to be irradiated) 2. Also, the illumination device 3 of the present embodiment is provided with the frame member (separating member) 15 that is disposed so as not to make contact with the optical sheets 13 and that separates the optical sheets 13 from the liquid crystal panel 2 so as to create a prescribed space therebetween. With this configuration, in the illumination device 3 of the present embodiment, unlike the conventional example, an occurrence of deformation such as warping in the optical sheets 13 can be reliably prevented even when an external pressure is applied from the side where the liquid crystal panel 2 is disposed. As a result, in the present embodiment, the degradation of the light-emitting quality caused by the deformation of the optical sheets 13 can be reliably prevented, and therefore, it is possible to provide the illumination device 3 having excellent light-emitting quality.

Also, in the present embodiment, the illumination device 3 that is capable of reliably preventing an occurrence of deformation such as warping in the optical sheets 13 even when an external pressure is applied from the side where the liquid crystal panel 2 is disposed and that thereby has excellent light-emitting quality is employed, and therefore, the liquid crystal display device 1 that has high brightness and excellent display quality can be achieved with ease.

Embodiment 2

Figure 4:
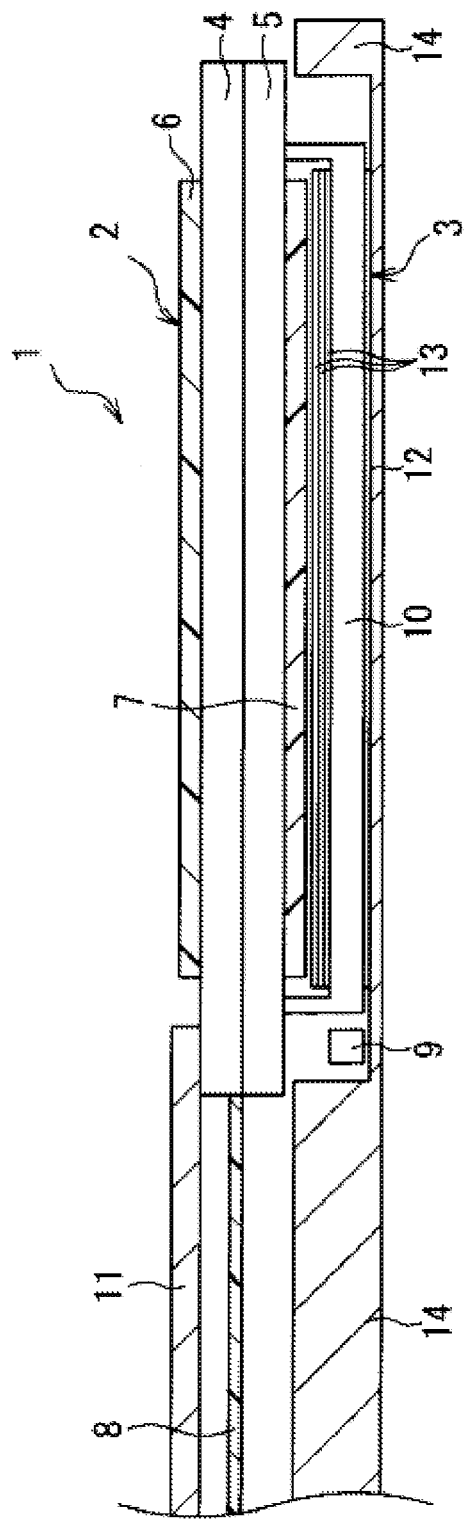
FIG. 4 is an explanatory diagram for an illumination device and a liquid crystal display device according to Embodiment 2 of the present invention.
Figure 5:
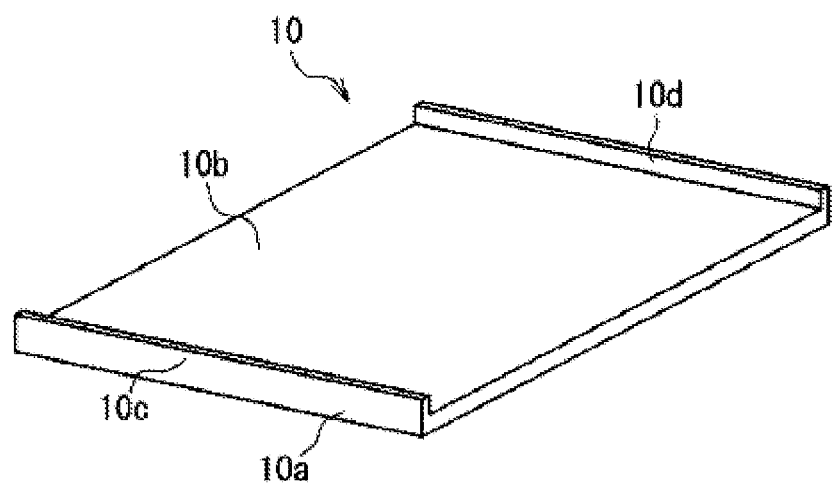
FIG. 5(a) is a perspective view for illustrating a specific configuration of a light guide plate shown in FIG. 4.
FIG. 5(b) is an enlarged partial view for illustrating a configuration of a principal portion of the illumination device shown in FIG. 4.
Figure 5:
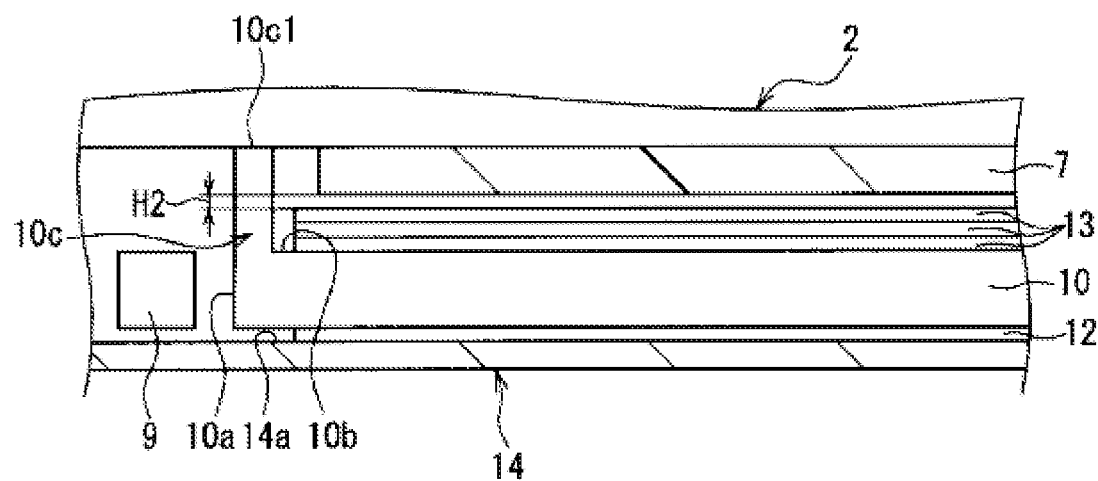

FIG. 4 is an explanatory diagram for an illumination device and a liquid crystal display device according to Embodiment 2 of the present invention. FIG. 5(a) is a perspective view for illustrating a specific configuration of the light guide plate shown in FIG. 4. FIG. 5(b) is an enlarged partial view for illustrating a configuration of the principal portion of the illumination device shown in FIG. 4. In the figure, the present embodiment mainly differs from Embodiment 1 above in that a member that is formed integrally with the light guide plate is used as the separating member, instead of the frame member. It should be noted that the same reference characters are given to the same elements as those of Embodiment 1 above, and the descriptions thereof will not be repeated.

That is, as shown in FIGS. 4, 5(a), and 5(b), in the illumination device 3 of the present embodiment, the light-emitting diodes 9 are disposed inside the bezel 14 so as to face the light incident surface 10a of the light guide plate 10. The light guide plate 10 has a separating member formed integrally therewith. That is, in the light guide plate 10, at one end and the other end along the shorter side direction that face each other, protruding portions 10c and 10d that protrude from the light-emitting surface 10b toward the liquid crystal panel 2 are respectively formed. These protruding portions 10c and 10d constitute the separating members.

That is, as shown in an example of FIG. 5(b), when the light guide plate 10 is placed in the bezel 14, and the liquid crystal panel 2 is attached thereon, one end surface 10c1 of the protruding portion 10c of the light guide plate 10 makes contact with the liquid crystal panel 2. This way, in the illumination device 3 of the present embodiment, the optical sheets 13 are disposed so as to have a prescribed space/distance from the liquid crystal panel 2 as indicated by "H2" in FIG. 5(b).

With the configuration describe above, in the present embodiment, functions and effects similar to those of Embodiment 1 above can be achieved. Also, in the present embodiment, because the protruding portions 10c and 10d (separating members) are formed integrally with the light guide plate 10, the number of parts in the illumination device 3 can be reduced, and the assembly operation of the illumination device 3 can be simplified as compared with those of Embodiment 1.

Figure 6:
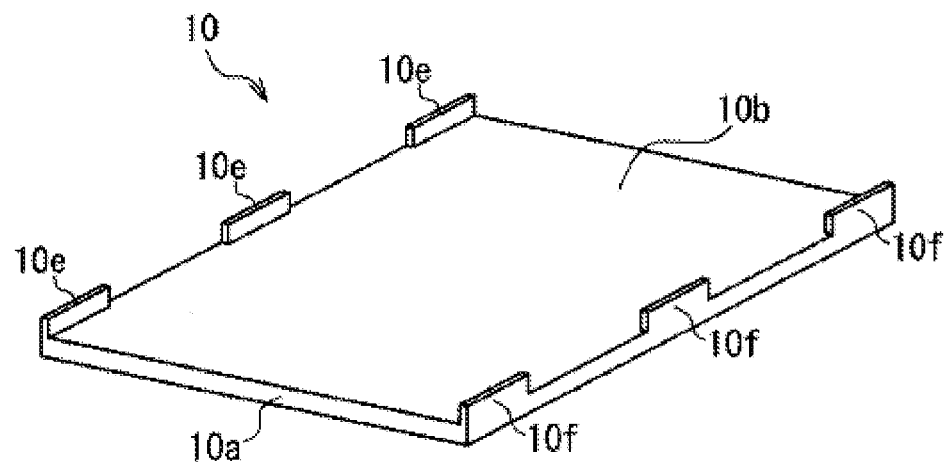
FIGS. 6(a) and 6(b) are perspective views respectively illustrating a specific configuration of modification examples of the light guide plate shown in FIG. 4.
Figure 6:
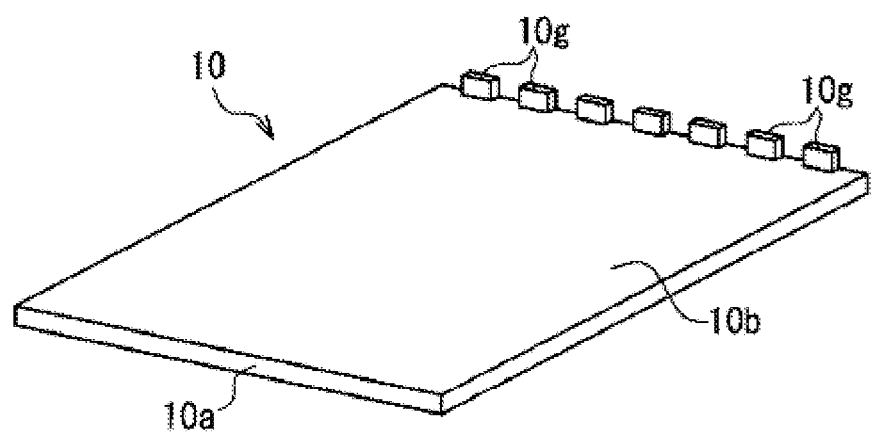

Other than the description above, the separating member may be formed integrally with the light guide plate 10 in a manner shown in FIGS. 6(a) and 6(b), for example. That is, as shown in FIG. 6(a), at one end and the other end along the longer side direction of the light guide plate 10 that face each other, a plurality of protruding portions 10e and a plurality of protruding portions 10f that protrude from the light-emitting surface 10b toward the liquid crystal panel 2 are formed integrally with the light guide plate 10, respectively. These protruding portions 10e and 10f constitute the separating members, and the top end surfaces thereof make contact with the liquid crystal panel 2. Alternatively, as shown in FIG. 6(b), at one end of the light guide plate 10 along the shorter side direction, a plurality of protruding portions 10g that protrude from the light-emitting surface 10b toward the liquid crystal panel 2 are formed integrally with the light guide plate 10. These protruding portions 10g constitute the separating members, and the top end surfaces thereof make contact with the liquid crystal panel 2.

Embodiment 3

Figure 7:
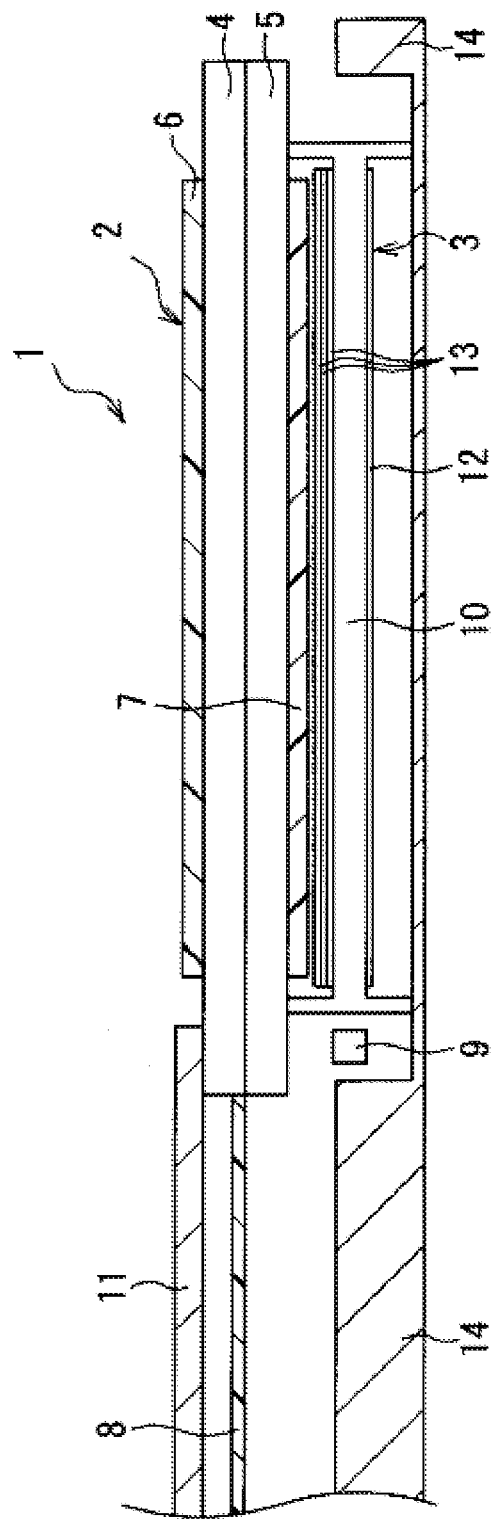
FIG. 7 is an explanatory diagram for an illumination device and a liquid crystal display device according to Embodiment 3 of the present invention.
Figure 8:
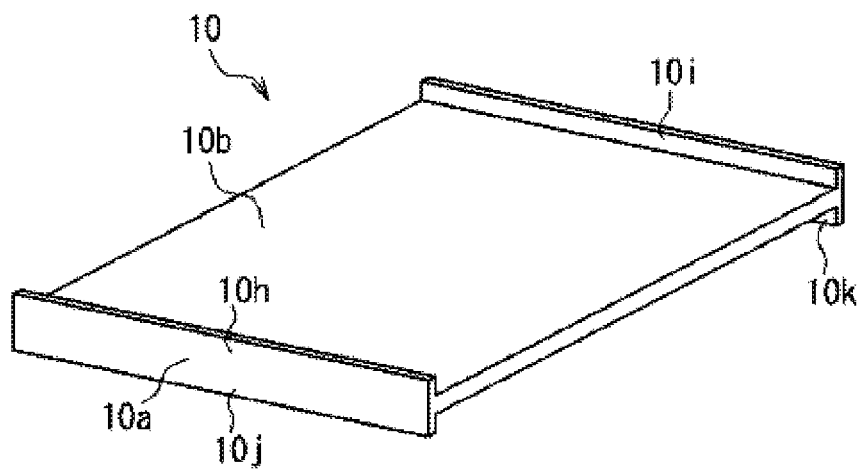
FIG. 8 (a) is a perspective view for illustrating a specific configuration of a light guide plate shown in FIG. 7.
Figure 8:
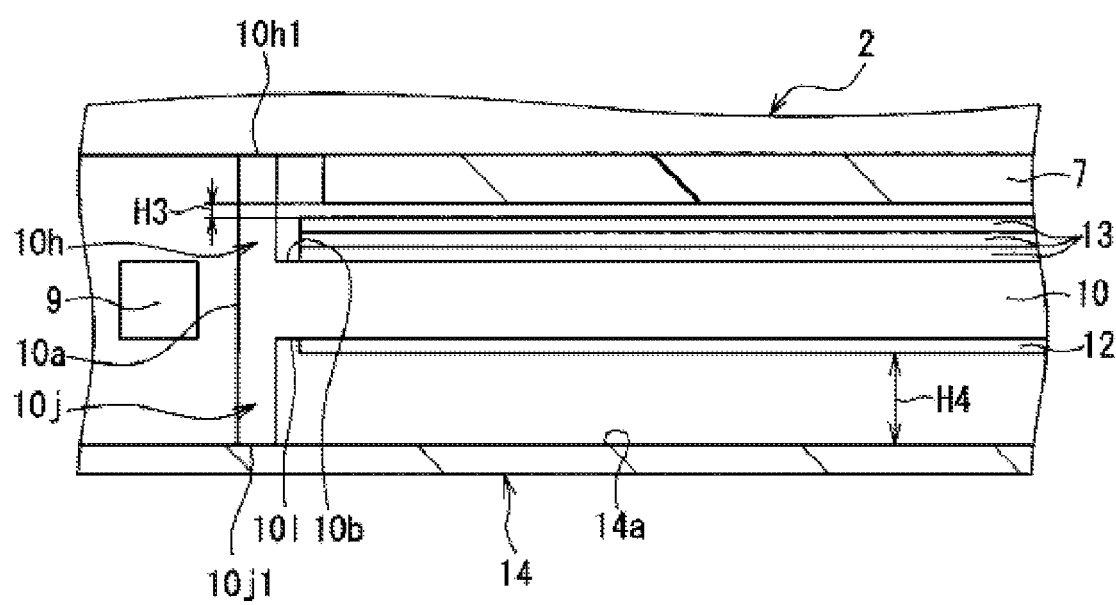

FIG. 7 is an explanatory diagram for an illumination device and a liquid crystal display device according to Embodiment 3 of the present invention. FIG. 8(a) is a perspective view for illustrating a specific configuration of the light guide plate shown in FIG. 7. FIG. 8(b) is an enlarged partial view for illustrating a configuration of the principal portion of the illumination device shown in FIG. 7. In the figure, the present embodiment mainly differs from Embodiment 2 above in that a second separating member that separates a reflective sheet from a bezel so as to create a prescribed space therebetween is formed integrally with the light guide plate. It should be noted that the same reference characters are given to the same elements as those of Embodiment 2 above, and the descriptions thereof will not be repeated.

That is, as shown in FIGS. 7, 8(a), and 8(b), in the illumination device 3 of the present embodiment, the light-emitting diodes 9 are disposed inside the bezel 14 so as to face the light incident surface 10a of the light guide plate 10. The light guide plate 10 has the separating member formed integrally therewith. Specifically, in the light guide plate 10, at one end and the other end along the shorter side direction that face each other, protruding portions 10h and 10i that protrude from the light-emitting surface 10b toward the liquid crystal panel 2 are respectively formed. These protruding portions 10h and 10i constitute the separating members.

Also, in the light guide plate 10 of the present embodiment, at one end and the other end that face each other in the shorter side direction, protruding portions 10j and 10k that protrude from an opposite surface 101, which is opposite to the light-emitting surface 10b, toward the bottom surface 14a of the bezel 14 are respectively formed. These protruding portions 10j and 10k constitute the second separating members that are disposed so as not to make contact with the reflective sheet 12 and that separates the reflective sheet 12 from the bezel 14 so as to create a prescribed space therebetween.

That is, as shown in an example of FIG. 8(b), when the light guide plate 10 is placed in the bezel 14, and the liquid crystal panel 2 is attached thereon, one end surface 10h1 of the protruding portion 10h of the light guide plate 10 makes contact with the liquid crystal panel 2. Therefore, in the illumination device 3 of the present embodiment, the optical sheets 13 are disposed so as to have a prescribed space/distance from the liquid crystal panel 2 as indicated by "H3" in FIG. 8(b).

Also, as shown in an example of FIG. 8(b), when the light guide plate 10 is placed in the bezel 14, and the liquid crystal panel 2 is attached thereon, one end surface 10j1 of the protruding portion 10j of the light guide plate 10 makes contact with the bottom surface 14a of the bezel 14. Therefore, in the illumination device 3 of the present embodiment, the reflective sheet 12 is disposed so as to have a prescribed space/distance from the bezel 14 as indicated by "H4" in FIG. 8(b).

With the configuration described above, in the present embodiment, functions and effects similar to those of Embodiment 2 can be achieved. Also, in the present embodiment, the protruding portions 10j and 10k (second separating members) are formed integrally with the light guide plate 10, and therefore, even when an external pressure is applied from the side where the liquid crystal panel 2 is disposed, an occurrence of deformation such as warping in the reflective sheet 12 can be reliably prevented by these protruding portions 10j and 10k.

All of the above-mentioned embodiments are illustrative and not limiting. The technical scope of the present invention is defined by the claims, and any modifications within a scope that corresponds to the configurations stated in the claims and their equivalents are also encompassed by the present invention.

In the description above, the configuration in which the present invention is used for the transmissive liquid crystal display device was explained, for example. However, the illumination device of the present invention is not limited to such, and may be used for various liquid crystal display devices such as a transflective liquid crystal display device or a projection display device that employs a liquid crystal panel as a light valve.

Other than the description above, the present invention can be suitably used as an illumination device for an x-ray film viewer that radiates light to an x-ray film, for a light box that radiates light to a photograph negative and the like to make them easier to see, or for a light-emitting device that illuminates signs or advertisement placed on the wall surfaces in train stations, and the like.

In the descriptions above, the configuration in which light-emitting diodes are used as the light source was explained as an example. However, the light source of the present invention is not limited to such, and other electric discharge tubes such as cold-cathode fluorescent lamps or hot-cathode fluorescent lamps can also be used.

In the descriptions above, the configuration in which the light source is disposed so as to face one side surface of the light guide plate was explained as an example. However, the present invention is not limited to such as long as the light source is disposed so as to face at least one side surface of the light guide plate.

In the description of Embodiment 1 above, the configuration in which the cut-out portions that hold the light-emitting diodes (light source) are formed in the frame member (separating member) was explained as an example. However, the present invention is not limited to such, and it can also be configured such that the light source is disposed inside of the frame member (side facing the light guide plate), or the light source is disposed outside of the frame member by forming through holes in the frame member so as to allow light from the light source to enter the light guide plate, for example.

However, it is more preferable to form cut-out portions in the frame member for holding the light source therein, as in Embodiment 1 above, because it can prevent the illumination device from becoming unnecessary large.

Other than the description in Embodiment 1, the frame member may also be used as the second separating member. That is, in a manner similar to Embodiment 3, the frame member may be extended toward the bezel so as to create a prescribed space between the reflective sheet and the bezel (container), which allows the frame member to serve as both the separating member and the second separating member.

In the descriptions of Embodiments 2 and 3, the configuration in which the protruding portions (separating members) are formed integrally with the light guide plate was explained as an example. However, the separating member of the present invention is not limited to such as long as it is disposed on the light-emitting surface of the light guide plate such that one end surface and the other end surface respectively make contact with the liquid crystal panel (object to be irradiated) and the light-emitting surface of the light guide plate, and therefore, a separating member provided as a separate part from the light guide plate can also be used.

However, it is more preferable to form the separating member integrally with the light guide plate, as in Embodiments 2 and 3, because it allows for a simplified assembly operation of the illumination device.

In the description of Embodiment 3 above, the configuration in which the protruding portion (second separating member) is formed integrally with the light guide plate was explained as an example. However, the second separating member of the present invention is not limited to such as long as it is disposed on the opposite surface of the light guide plate such that one end surface and the other end surface respectively make contact with the opposite surface of the light guide plate and the bottom surface of the container, and therefore, a second separating member provided as a separate part from the light guide plate can also be used.

However, it is preferable to form the second separating member integrally with the light guide plate, as in Embodiment 3, because it allows for a simplified assembly operation of the illumination device. Further, it is more preferable to form the separating member and the second separating member integrally with the light guide plate, because the assembly operation of the illumination device can be simplified with ease.

INDUSTRIAL APPLICABILITY

The present invention is useful for an illumination device that is capable of reliably preventing an occurrence of deformation such as warping in optical members even when an external pressure is applied from the side where an object to be irradiated is disposed and that thereby has excellent light-emitting quality, and for a display device equipped with the same.

DESCRIPTIONS OF REFERENCE CHARACTERS 1 liquid crystal display device
2 liquid crystal panel (object to be irradiated)
3 illumination device
9 light-emitting diode (light source)
10 light guide plate
10a light incident surface
10b light-emitting surface
10c, 10d, 10e, 10f, 10g, 10h, 10i protruding portion (separating member)
10j, 10k protruding portion (second separating member)
101 opposite surface
12 reflective sheet
13 optical sheet (optical member)
14 bezel
15 frame member (separating member)
15a cut-out portion

The invention claimed is:

1. An illumination device, comprising:
a light source;
a light guide plate that guides light from the light source toward a prescribed propagation direction and that transmits the light toward an object to be irradiated;
an optical member attached to the light guide plate on a side facing the object to be irradiated;
a separating member that is disposed so as not to make contact with the optical member and that separates the optical member from the object to be irradiated so as to create a prescribed space therebetween;
a reflective sheet attached to the light guide plate on a side of an opposite surface that is opposite to a light-transmitting surface thereof;
a container with a bottom that houses the light source, the light guide plate, the optical member, and the reflective sheet; and
a second separating member that is disposed so as not to make contact with the reflective sheet and that separates the reflective sheet from the container so as to create a prescribed space therebetween,
wherein the second separating member is disposed on the opposite surface of the light guide plate such that one end surface and another end surface thereof make contact with the opposite surface of the light guide plate and the bottom surface of the container, respectively.

2. The illumination device according to claim 1, comprising:
as the separating member, a frame-shaped frame member that is disposed so as to surround a periphery of the light guide plate, the frame-shaped frame member being placed inside the container such that one end surface and another end surface thereof make contact with the object to be irradiated and a bottom surface of the container, respectively.

3. The illumination device according to claim 2, wherein the frame member has a cut-out portion that holds the light source therein such that the light source is disposed so as to face a light incident face of the light guide plate.

4. The illumination device according to claim 1, wherein the separating member is disposed on a light-transmitting surface of the light guide plate such that one end surface and another end surface of the separating member make contact with the object to be irradiated and the light-transmitting surface of the light guide plate, respectively.

5. The illumination device according to claim 4, wherein the separating member is formed integrally with the light guide plate.

6. The illumination device according to claim 1, wherein the separating member and the second separating member are formed integrally with the light guide plate.

7. A display device, comprising the illumination device according to claim 1.

8. The display device according to claim 7, comprising a liquid crystal panel as the object to be irradiated.

* * * * *